United States Patent [19]

Wendel

[11] Patent Number: 4,649,701

[45] Date of Patent: Mar. 17, 1987

[54] THRUST NOZZLE WITH INSULATION

[75] Inventor: Gary M. Wendel, West Jordan, Utah

[73] Assignee: The United States of America as represented by the Secretary of the Navy, Washington, D.C.

[21] Appl. No.: 831,022

[22] Filed: Feb. 11, 1986

[51] Int. Cl.$^4$ .............................................. F02K 1/00
[52] U.S. Cl. ....................................... 60/232; 60/242; 60/253; 239/265.43
[58] Field of Search ................ 60/217, 219, 230, 232, 60/242, 253, 39.091; 239/265.33, 265.43

[56] References Cited

U.S. PATENT DOCUMENTS

| | | | |
|---|---|---|---|
| 3,446,437 | 5/1969 | McCullough | 60/232 |
| 3,572,029 | 3/1971 | Swit, Jr. | 60/232 |
| 3,696,999 | 10/1972 | Desjardins | 60/232 |
| 3,698,192 | 10/1972 | Le Febvre, Jr. | 60/232 |
| 3,726,480 | 4/1973 | Miltenberger | 60/232 |
| 3,936,058 | 2/1976 | Clark et al. | 60/232 X |
| 3,946,557 | 3/1976 | MacBeth | 60/253 |
| 4,180,211 | 12/1979 | Olcott et al. | 239/265.43 |
| 4,441,312 | 4/1984 | Smith | 60/251 X |
| 4,489,889 | 12/1984 | Inman | 60/271 |

OTHER PUBLICATIONS

Wilson et al., *Dual Flex-A Low Horsepower Flexible Seal Nozzle*, J. Spacecraft + Rockets, vol. 9, No 8, Aug., 1972, p. 567+8.

*Primary Examiner*—Peter A. Nelson
*Attorney, Agent, or Firm*—R. F. Beers; C. D. B. Curry; S. G. Precivale

[57] ABSTRACT

A thrust nozzle of the hollow-cone type affixed to a stationary shell having external insulation on the nozzle and the shell and the nozzle having a liner extending beyond its edge and having insulation over the extended portion.

6 Claims, 2 Drawing Figures

THRUST NOZZLE WITH INSULATION

BACKGROUND OF THE INVENTION

1. Field of the Invention

This invention relates to thrust nozzles for rocket missiles. More particularly, this invention relates to nozzles wherein the thrust vector of the exhaust gases may be altered by moving a portion of the nozzle. Still more particularly, but without limitation thereto, this invention relates to the application of insulation and a liner to the thrust nozzle.

2. Description of the Prior Art

Various techniques have been attempted in the prior art for means of steering missiles. An example of one such measure utilized in the prior art is the movement or deformation of the thrust nozzle in some manner so as to alter the direction of the exhaust gases flowing through the nozzle.

However, despite the well established reliability of this measure, there are two inherent problems with the use of movable nozzles: means to maintain a constant seal between the nozzle and the missile case; and lightweight means for mounting the nozzle so that it may be moved according to some constant relationship to the missile. The latter problem has been solved to some degree by the use of separate components such as gimbal rings for mounting a movable nozzle to a missile. Recent developments utilize a flexible bearing between the missile casing and the nozzle. In this manner, the bearing not only permits movement of the nozzle but also acts as a seal, along with eliminating a considerable amount of weight as compared to gimbal rings.

This invention utilizes the standard concepts of a flexible bearing but the inventive concept is the use of insulation and carbon-carbon at specific areas of the nozzle. The purpose of the nozzle is to convert the random heat or thermal energy released by the combustion of the propellants into directed energy of motion or mass kinetic energy of the exhaust gases. The use of lightweight insulation with a thin carbon-carbon liner provides for more efficient energy conversion.

SUMMARY OF THE INVENTION

An object of the present invention is to provide efficient energy conversion within the nozzle.

Another object of the invention is to provide an adequate gas seal between the nozzle and the missile casing.

A further object of the invention is to provide a reliable, lightweight thrust vector control nozzle for missiles.

These and other objects have been demonstrated by the present invention wherein insulation is applied to the thrust nozzle and a thin carbon-carbon liner allows exhaust gases to pass through the integral throat entry and expand within the exit cone, which may be moved to provide thrust vector control by means of two actuators.

BRIEF DESCRIPTION OF THE DRAWING

The invention will be described in further detail with reference to the accompanying drawings wherein.

DESCRIPTION OF THE PREFERRED EMBODIMENT

Figure 1:
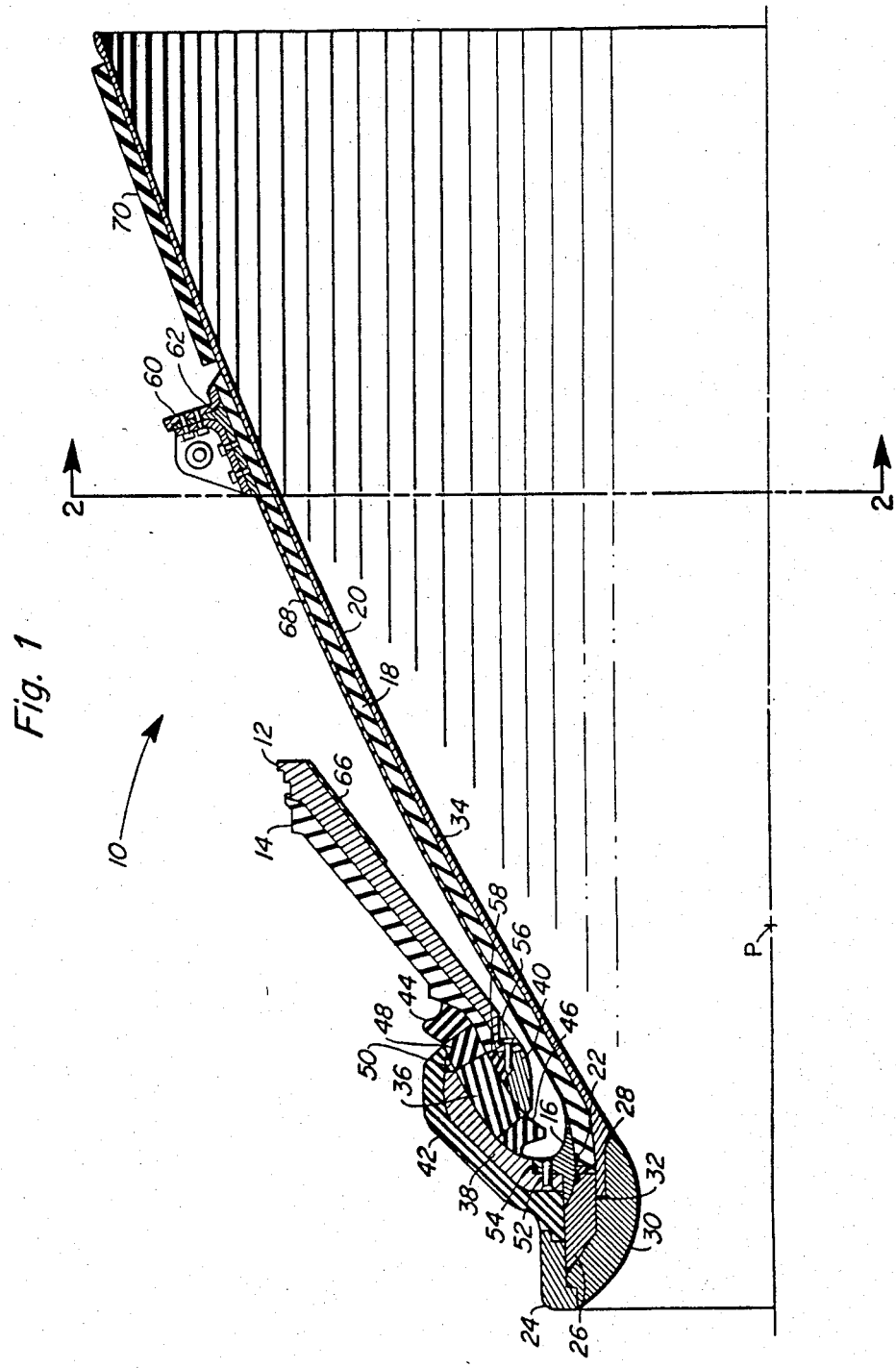
FIG. 1 is a cross-sectional view of the invention taken along the longitudinal axis.

The preferred embodiment of the invention includes the rocket nozzle 10 in FIG. 1. It consists of a stationary shell 12 and stationary shell insulation 14. The stationary shell 12 is preferably of forged aluminum, and stationary shell insulation 14 is carbon fiber filled ethylene propylenediene monomer (EPDM) tape which is wrapped around the shell 12 parallel to the centerline and cured in place. The shell 12 and insulation 14 interface with the motor aft port and are attached with a snap ring retention system, not shown.

The nozzle 10 further consists of a hollow divergent exit cone shell 16, preferably of forged aluminum, having exit cone insulation 18 and an exit cone liner 20. Positioned between the exit cone shell 16 and the exit cone insulation 18 is seal 22. The entrance cap 24, preferably three directional carbon-carbon, is threaded onto a throat support ring 26. The ring 26 is tape wrapped carbon/phenolic, and seal 28 is placed between the exit cone shell 16 and the ring 26. The integral throat entry 30, preferably three directional carbon-carbon, is threaded onto the exit cone liner 20, preferably carbon-carbon with seal 32 positioned between said entry 30 and liner 20.

An air gap 34, about 0.040 inches thick, is provided between the exit cone insulation 18 and the exit cone liner 20. This air gap 34 functions to allow thermal expansion of the exit cone liner 20 during operation. The exit cone insulation 18 is preferably of a low density silica/phenolic tape wrapped parallel to the centerline. The insulation 18 includes axial grooves to allow for the release of gases due to phenolic decomposition of the insulation 18 during operation.

Movement of the nozzle 10 is accomplished by means of a flexible seal configuration comprising a core 36, a forward end ring 38 and an aft end ring 40. The forward end ring insulation 42 is located adjacent to the forward end ring 38, and ozone barriers 44 and 46 are located on the external sides of the core 36. The insulation 42 is made of carbon fiber filled EPDM tape wrapped parallel to the centerline, and the ozone barriers 44 and 46 are made of a material such as chlorobutyl rubber. The core 36 is made of glass epoxy reinforcements sandwiched between rubber. Some reinforcements extend beyond the rubber to form a thermal barrier 48 which lies between the core 36 and the ozone barrier 44. The thermal barrier functions to protect the core 36 from the motor environment. A rubber insulator 50 is also located at the junction where the forward end ring insulation 42 and the core 36 meet.

The forward end ring 38 is bolted to the exit cone shell 16 by means of a plurality of bolts circumferentially positioned. Illustrative of this is bolt 52 shown in FIG. 1. Seal 54 is placed adjacent to said bolts. Similarly, the aft end ring 40 is bolted to the stationary shell 12 by means of a plurality of bolts. Illustrative of this is bolt 56 shown in FIG. 1. Seal 58 is placed adjacent to said bolts.

Figure 2:
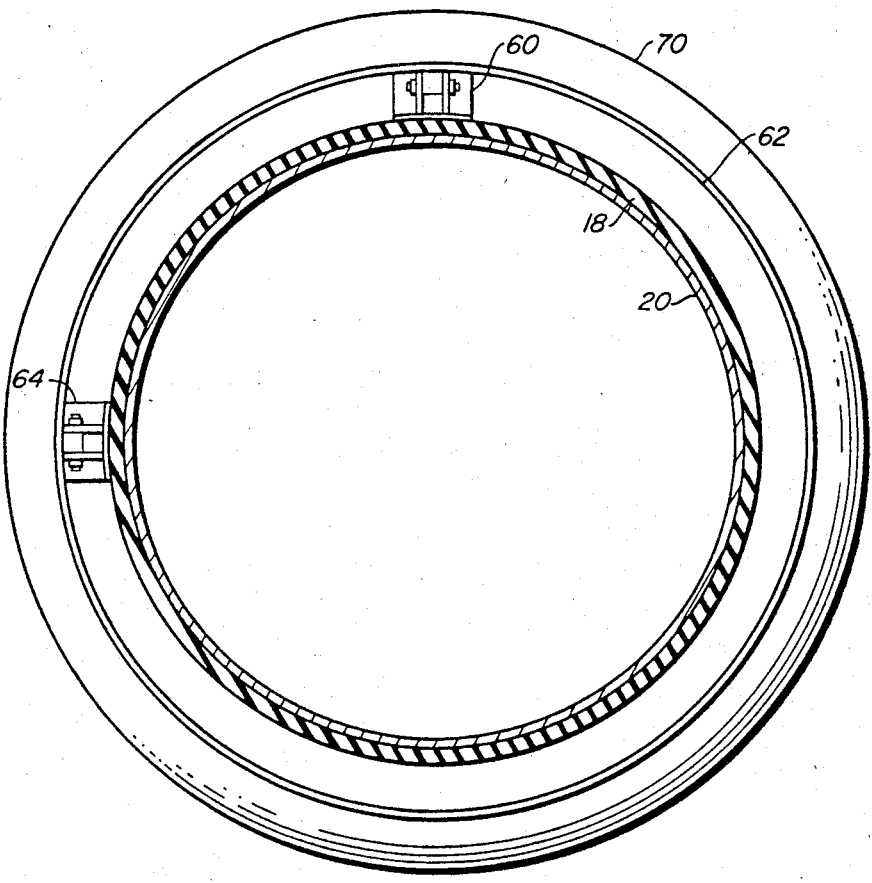
FIG. 2 is a cross-sectional view taken along line 2—2 of FIG. 1.

In operation, exhaust gases pass through the throat entry 30 and expand within the exit cone liner 20 which can be moved to provide thrust vector control. This is achieved by two actuators, not shown, one of which is operatively connected to an actuator bracket 60, which in turn is affixed to a compliance ring 62, integral with the exit cone shell 16. The second actuator is operatively connected to an actuator bracket 64 positioned 90 degrees from bracket 60, as is shown in FIG. 2, the end view of nozzle 10. Bracket 64 in turn, is affixed to the integral compliance ring 62. The point P, shown in FIG. 1, is the center of rotation for the movable nozzle when the exit cone shell 16 is moved by the actuators.

The key feature of this invention is the use of advanced materials for lightweight ablation protection and thermal insulation purposes. External insulation 66 is placed along the edge of the stationary shell 12 and insulation external 68 is placed along the edge of the exit cone shell 16. Both insulation 66 and 68 are preferably of cork. A strip of liner external insulation 70, preferably of graphite felt, is positioned along the edge of the exit cone liner 20 which extends beyond the exit cone insulation 18.

The foregoing description has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. In a rocket thrust nozzle that includes a hollow divergent exit cone shell affixed to a stationary shell by means of a flexible seal, the improvement comprising external insulation adjacent to the external sides of said cone shell and said stationary shell, exit cone insulation adjacent to the internal side of said cone shell, an exit cone liner adjacent to and extending beyond said exit cone insulation and liner external insulation adjacent to said extended portion of said liner.

2. The nozzle of claim 1 wherein said external insulation is cork.

3. The nozzle of claim 1 wherein said exit cone insulation is low density silica/phenolic tape.

4. The nozzle of claim 1 wherein said liner external insulation is graphite felt.

5. The nozzle of claim 1 which further comprises an air gap positioned between said exit cone liner and said exit cone insulation.

6. The nozzle of claim 1 wherein said exit cone liner is carbon-carbon.

* * * * *